United States Patent
Sato et al.

(10) Patent No.: US 9,871,268 B2
(45) Date of Patent: Jan. 16, 2018

(54) SECONDARY BATTERY MANUFACTURING METHOD AND MANUFACTURING APPARATUS

(71) Applicants: ELIIY Power Co., Ltd., Tokyo (JP); NAGANO AUTOMATION CO., LTD., Nagano (JP)

(72) Inventors: Hiroshi Sato, Tokyo (JP); Seiji Yamaura, Nagano (JP)

(73) Assignees: ELIIY POWER CO., LTD., Tokyo (JP); NAGANO AUTOMATION CO., LTD., Nagano (JP)

( * ) Notice: Subject to any disclaimer, the term of this patent is extended or adjusted under 35 U.S.C. 154(b) by 368 days.

(21) Appl. No.: 14/436,699

(22) PCT Filed: Oct. 17, 2012

(86) PCT No.: PCT/JP2012/076826
§ 371 (c)(1),
(2) Date: Apr. 17, 2015

(87) PCT Pub. No.: WO2014/061119
PCT Pub. Date: Apr. 24, 2014

(65) Prior Publication Data
US 2015/0333361 A1 Nov. 19, 2015

(51) Int. Cl.
*H01M 10/04* (2006.01)
*H01M 10/0525* (2010.01)
(Continued)

(52) U.S. Cl.
CPC ....... *H01M 10/0459* (2013.01); *H01M 2/145* (2013.01); *H01M 4/04* (2013.01);
(Continued)

(58) Field of Classification Search
None
See application file for complete search history.

(56) References Cited

U.S. PATENT DOCUMENTS

| 8,617,257 B2 | 12/2013 | Kadowaki et al. |
| 2006/0051652 A1 | 5/2006 | Samuels |

(Continued)

FOREIGN PATENT DOCUMENTS

| CN | 101752607 | 6/2010 |
| EP | 2 149 927 | 2/2010 |

(Continued)

OTHER PUBLICATIONS

Extended European Search Report—EP 12 88 6647—dated May 25, 2016.
(Continued)

*Primary Examiner* — Scott J. Chmielecki
(74) *Attorney, Agent, or Firm* — Young & Thompson

(57) ABSTRACT

A secondary battery manufacturing method enables smooth pulling of a separator by guide members by inhibiting a phenomenon in which, when the separator is being pulled by the guide members, the separator moves in the width direction and rattles. The method includes pulling in a separator by guide bars to zigzag-fold the separator; and suspending the separator between the guide bars via a suspension roller while locating buffer rollers at a predetermined descending position, the buffer rollers being disposed between support rollers for supporting the separator at midpoints upstream, in the transport direction of the separator, of the suspension roller, the buffer rollers being ascendable and descendable in contact with an upper surface of the separator to be adjustable vertically, and allowing the buffer rollers to ascend in accordance with movement of the guide bars, thereby supplying the separator of a length pulled in by the guide bars.

18 Claims, 15 Drawing Sheets

(51) Int. Cl.
*H01M 4/04* (2006.01)
*H01M 2/14* (2006.01)
*H01M 10/0583* (2010.01)
*H01M 10/052* (2010.01)

(52) U.S. Cl.
CPC ........... *H01M 4/043* (2013.01); *H01M 10/04* (2013.01); *H01M 10/0404* (2013.01); *H01M 10/0525* (2013.01); *H01M 10/0583* (2013.01); *H01M 10/052* (2013.01); *H01M 2220/10* (2013.01); *H01M 2220/20* (2013.01); *Y10T 29/4911* (2015.01); *Y10T 29/53135* (2015.01)

(56) References Cited

U.S. PATENT DOCUMENTS

| | | | |
|---|---|---|---|
| 2009/0165936 A1* | 7/2009 | Sakata | B32B 38/1808 156/227 |
| 2010/0132308 A1 | 6/2010 | Kadowaki et al. | |
| 2012/0110836 A1* | 5/2012 | Oh | H01M 10/0404 29/623.1 |
| 2013/0143094 A1* | 6/2013 | Huang | H01M 10/0459 429/136 |
| 2013/0177787 A1* | 7/2013 | Arima | H01M 2/348 429/62 |
| 2014/0101928 A1* | 4/2014 | Sato | H01M 10/0583 29/623.1 |
| 2014/0230239 A1* | 8/2014 | Sato | H01M 10/0583 29/623.1 |
| 2014/0353125 A1 | 12/2014 | Iwata et al. | |

FOREIGN PATENT DOCUMENTS

| | | |
|---|---|---|
| EP | 2 816 653 | 12/2014 |
| JP | 2004-022449 | 1/2004 |
| JP | 2005-50583 | 2/2005 |
| JP | 2009-140772 | 6/2009 |
| JP | 2009-140775 | 6/2009 |
| JP | 2009-158317 | 7/2009 |
| JP | 2009-199835 | 9/2009 |
| WO | 2006/014989 | 2/2006 |
| WO | 2008139561 | 11/2008 |
| WO | 2012144008 | 10/2012 |

OTHER PUBLICATIONS

International Search Report PCT/JP2012/076826 dated Nov. 20, 2012.

* cited by examiner (a)

(b)

(a)

(b)

SECONDARY BATTERY MANUFACTURING METHOD AND MANUFACTURING APPARATUS

TECHNICAL FIELD

This invention relates to a method for manufacturing a secondary battery and an apparatus for manufacturing the same and, in particular, those useful for application to the manufacturing of a lithium ion secondary battery.

BACKGROUND ART

A secondary battery such as a lithium ion secondary battery has an electrode plate group formed by alternately superposing positive electrode plates and negative electrode plates on each other such that separators are interposed between the positive and negative electrode plates. Available as one of devices for manufacturing the electrode plate group is a zigzag stack type manufacturing device which folds a continuous body of a separator in a zigzag fashion, inserts the positive electrode plates and the negative electrode plates into its respective folds, and squashes the resulting combination flat (see, for example, Patent Document 1). With such a zigzag stack type manufacturing device, the continuous separator is held between a pair of rollers, the paired rollers are moved in a reciprocating manner in a horizontal direction to fold the separator zigzag and, upon each reciprocation of the pair of rollers, the positive and negative electrode plates are placed on the separator alternately.

In an attempt to shorten the tact time further using the zigzag stack type manufacturing device of Patent Document 1, the present inventors proposed a manufacturing method and a manufacturing apparatus for a secondary battery capable of improving the position accuracies of positive and negative electrodes and a separator (see Patent Document 2). According to the manufacturing method and apparatus, a belt-shaped separator is suspended from above in a tension-free state, and a plurality of guide members are crossed horizontally between their rows to fold the separator (or a superposed body comprising one of a positive electrode plate and a negative electrode plate sandwiched between two separators) in a zigzag manner. Positive electrode plates and negative electrode plates (in the case of the superposed body, the electrode plates other than the sandwiched one electrode plate) are inserted into the resulting folds to produce an electrode plate group of a secondary battery in which the positive electrode plates and the negative electrode plates are superposed in layers, with the separator being sandwiched between them. The separator has an upper side accommodated within an accommodation case disposed above a zigzag folding means, whereby the separator is suspended downward via a roller, and a lower side of the separator is accommodated within a similar accommodation case disposed below the zigzag folding means. In this manner, the upper side and the lower side of the separator are accommodated in the upper and lower accommodation cases, so that a buffer part (excess length part) in zigzag folding the separator is secured. That is, during zigzag folding, the right and left guide members move in directions, in which they approach each other, to pull in the separator in the same direction. A separator length for allowing the separator to follow this motion needs to be secured.

PRIOR ART DOCUMENTS

Patent Documents

Patent Document 1: JP-A-2004-22449
Patent Document 2: PCT/JP2011/059567

SUMMARY OF THE INVENTION

Problems to be Solved by the Invention

With the secondary battery manufacturing method and manufacturing apparatus according to Patent Document 2 mentioned above, during zigzag folding in the zigzag folding means, the separator suspended between the opposing guide members has its upper side accommodated within the accommodation case disposed above the zigzag folding means, whereby the separator is suspended downward via the roller, and the lower side of the separator is accommodated within the accommodation case disposed below the zigzag folding means. In this state, the separator is rendered tension-free, with its position in the width direction being unregulated.

As a result, according to Patent Document 2, the position accuracies of the positive and negative electrodes and the separator can be expected to be improved as compared with those described in Patent Document 1. However, when the separator is zigzag-folded by the movement of the plurality of guide members, there is a possibility that the separator will be drawn into the guide members while fluttering. Such a possibility increases owing to variations in the width, thickness and surface condition of the separator, and there may arise cases where the accuracy of the aforementioned electrode plate group falls outside the tolerance range. Hence, the use of a specific separator with predetermined dimensions such as width and thickness is suitable, but if a separator with different dimensions is used, due care must be paid to influences due to the fluttering of the separator.

According to Patent Document 2, moreover, each time the zigzag folding operation is performed, the separator is cut to a length suitable for each zigzag folding operation, and used in order to create a tension-free state of the separator, with the upper side and lower side of the separator suspended between the guide members of the zigzag folding means being accommodated in the accommodation cases. For this purpose, a margin part of the separator for its cutting necessarily needs to be secured in the vicinity of a cutting site.

The present invention has been accomplished in the light of the above-described problems of the conventional technologies. It is an object of the invention to provide a manufacturing method and a manufacturing apparatus for a secondary battery which, by allowing guide members to pull in a separator smoothly during zigzag folding, can improve product accuracy further and, at the same time, can increase the yield of the separator as much as possible.

Means for Solving the Problems

A first aspect of the present invention resides in
a secondary battery manufacturing method comprising the steps of: moving a plurality of rows of guide members arranged such that the rows of guide members oppose each other, with a separator being suspended between the rows via a suspension roller, thereby zigzag-folding the separator; inserting positive electrode plates and negative electrode plates alternately into respective folds of the zigzag-folded separator, thereby forming a layered body having the positive electrode plates and the negative electrode plates alternately superposed on each other via the separator; and pulling the guide members out of the respective folds of the separator, and then pressing the layered body in a direction in which the positive electrode plates and the negative electrode plates are superposed, thereby manufacturing an electrode plate group, wherein at least one buffer roller is disposed between at least two support rollers for supporting the separator at midpoints upstream, in a transport direction of the separator, of the suspension roller on a relatively upstream side and a relatively downstream side, the buffer roller making contact with one surface of the separator, and being arranged to be ascendable and descendable in a vertical direction, with the buffer roller being located at a predetermined ascending position or descending position while being kept in contact with the separator, the separator is suspended between the guide members via the suspension roller, and during the step of zigzag folding by movement of the guide members, the buffer roller descends or ascends.

According to the above aspect, the pull-in length of the separator to be zigzag-folded can be complemented by the ascent of the buffer roller disposed to be ascendable and descendable. Thus, the separator can be subjected to predetermined zigzag folding in a continuous state, without being cut beforehand. In this manner, zigzag folding can be performed in a substantially tension-free state. Consequently, the phenomenon in which, when the separator is pulled in by the guide members, the separator moves in the width direction and flutters is suppressed, whereby the pulling-in of the separator by the guide members can be carried out smoothly.

Furthermore, the separator need not be cut to a predetermined length before being zigzag-folded, but can be subjected to a predetermined zigzag folding operation in a continuous state. Thus, the yield of the separator can be increased to as high a level as possible.

A second aspect of the present invention resides in a secondary battery manufacturing method comprising the steps of: moving a plurality of rows of guide members arranged such that the rows oppose each other, with a superposed body being suspended between the rows of guide members via a suspension roller, the superposed body comprising one of a positive electrode plate and a negative electrode plate sandwiched between two separators, thereby zigzag-folding the superposed body; inserting the electrode plates other than the sandwiched one electrode plate into respective folds of the zigzag-folded superposed body, thereby forming a layered body having the positive electrode plate and the negative electrode plate alternately superposed on each other via the separator; and pulling the guide members out of the respective folds of the superposed body, and then pressing the layered body in a direction in which the positive or negative electrode plate and the negative or positive electrode plates are superposed, thereby manufacturing an electrode plate group, wherein at least one buffer roller is disposed between at least two support rollers for supporting the superposed body at midpoints upstream, in a transport direction of the superposed body, of the suspension roller on a relatively upstream side and a relative downstream side, the buffer roller making contact with one surface of the superposed body, and being arranged to be ascendable and descendable in a vertical direction, with the buffer roller being located at a predetermined ascending position or descending position while being kept in contact with the superposed body, the superposed body is suspended between the guide members via the suspension roller, and during zigzag folding by movement of the guide members, the buffer roller descends or ascends.

According to the present aspect, in addition to the same actions and effects as in the first aspect, it suffices to insert only the electrode plates of one type into the superposed body. When an electrode plate group having the same performance as in the first aspect is to be produced, therefore, the number of the folds of the superposed body can be halved, and the number of the guide members can be decreased to almost half, so that the simplification of the apparatus and an increase in the yield can be expected.

A third aspect of the present invention resides in the secondary battery manufacturing method according to the first or second aspect, wherein between the most downstream support roller of the support rollers and the suspension roller, a gas is blown from below a lower surface of the separator or superposed body moving therebetween to support the separator or superposed body.

According to the present aspect, the separator or superposed body can be supported without physical contact with the separator or superposed body. Thus, predetermined transport of the separator or superposed body can be carried out satisfactorily.

A fourth aspect of the present invention resides in the secondary battery manufacturing method according to the third aspect, wherein the gas is ionized air.

According to the present aspect, static electrification of the separator or superposed body can be prevented or eliminated by the static removal effect of the ionized air. Thus, the attraction, due to electrostatic force, of adjacent parts of the separator or superposed body in the zigzag folding step can be prevented.

A fifth aspect of the present invention resides in the secondary battery manufacturing method according to any one of the first to fourth aspects, wherein between the most downstream support roller of the support rollers and the suspension roller, the separator or superposed body is transported in an inclined manner so as to ascend from the support roller toward the suspension roller.

According to the present aspect, kinetic energy associated with a travel of the separator or superposed body transported from the support roller toward the suspension roller can be converted into potential energy to apply a brake. As a result, even when the separator is pulled in abruptly in the zigzag folding step, the separator can be stopped satisfactorily at a predetermined position.

A sixth aspect of the present invention resides in a secondary battery manufacturing apparatus comprising:

a zigzag folding means having a plurality of guide members arranged zigzagging in a vertical direction, and being adapted to zigzag-fold a separator, which is suspended between one row and another row of the guide members via a suspension roller, by crossing the guide members between the rows in a horizontal direction;

an electrode plate insertion means including an electrode plate transport member for positive electrode plates on which a predetermined number of positive electrode plates are placed, and an electrode plate transport member for negative electrode plates on which a predetermined number of negative electrode plates are placed, and being adapted to move the electrode plate transport members for positive electrode plates and negative electrode plates into respective folds of the separator, thereby inserting the positive electrode plates and the negative electrode plates alternately into the respective folds; and a separator supply means equipped with at least two support rollers for supporting the separator at midpoints upstream, in a transport direction of the separator, of the suspension roller on a relatively upstream side and a relatively downstream side; and at least one buffer roller disposed between the support rollers, making contact with one surface of the separator, and arranged to be ascendable and descendable in a vertical direction, wherein when the buffer roller is located at a predetermined ascending position or descending position while contacting the separator, the separator is suspended between the guide members via the suspension roller, and during zigzag folding associated with movement of the guide members, the buffer roller descends or ascends.

According to the above aspect, the pull-in length of the separator to be zigzag-folded can be complemented by the ascent of the buffer roller disposed to be ascendable and descendable. Thus, the separator can be subjected to predetermined zigzag folding in a continuous state, without being cut beforehand. In this manner, zigzag folding can be performed in a substantially tension-free state. Consequently, the phenomenon in which, when the separator is pulled in by the guide members, the separator moves in the width direction and flutters is suppressed, whereby the pulling-in of the separator by the guide members can be carried out smoothly.

Furthermore, the separator need not be cut to a predetermined length before being zigzag-folded, but can be subjected to a predetermined zigzag folding operation in a continuous state. Thus, the yield of the separator can be increased to as high a level as possible.

A seventh aspect of the present invention resides in a secondary battery manufacturing apparatus comprising:

a zigzag folding means having a plurality of guide members arranged zigzagging in a vertical direction, and being adapted to zigzag-fold a superposed body, which comprises one of a positive electrode plate and a negative electrode plate sandwiched between two separators, which is suspended between one row and another row of the guide members via a suspension roller, by crossing the guide members between the rows in a horizontal direction;

an electrode plate insertion means including electrode plate transport members on which a predetermined number of the electrode plates other than the sandwiched one electrode plate are placed, and being adapted to move the electrode plate transport members into respective folds of the superposed body, thereby inserting the other electrode plates into the respective folds; and a separator supply means equipped with at least two support rollers for supporting the superposed body at midpoints upstream, in a transport direction of the superposed body, of the suspension roller on a relatively upstream side and a relatively downstream side; and at least one buffer roller disposed between the support rollers, brought into contact with one surface of the superposed body, and arranged to be ascendable and descendable in a vertical direction, wherein when the buffer roller is located at a predetermined ascending position or descending position while contacting the superposed body, the superposed body is suspended between the guide members via the suspension roller, and during zigzag folding associated with movement of the guide members, the buffer roller descends or ascends.

According to the present aspect, in addition to the same actions and effects as in the sixth aspect, it suffices to insert only the electrode plates of one type into the superposed body. When an electrode plate group having the same performance as in the sixth aspect is to be produced, therefore, the number of the folds of the superposed body can be halved, and the number of the guide members can be decreased to almost half. Hence, the simplification of the apparatus and an increase in the yield can be expected.

An eighth aspect of the present invention resides in the secondary battery manufacturing apparatus according to the sixth or seventh aspect, wherein an air blowing means for blowing a gas from below a lower surface of the separator or superposed body to support the separator or superposed body is disposed between the most downstream support roller of the support rollers and the suspension roller.

According to the present embodiment, the separator or superposed body can be supported without physical contact with the separator or superposed body. Thus, predetermined transport of the separator or superposed body can be carried out satisfactorily.

A ninth aspect of the present invention resides in the secondary battery manufacturing apparatus according to the eighth aspect, wherein the gas is ionized air.

According to the present aspect, static electrification of the separator or superposed body can be prevented or eliminated by the static removal effect of the ionized air. Thus, the attraction, due to electrostatic force, of adjacent parts of the separator or superposed body in the zigzag folding step can be prevented.

A tenth aspect of the present invention resides in the secondary battery manufacturing apparatus according to any one of the sixth to ninth aspects, wherein between the most downstream support roller of the support rollers and the suspension roller, the separator or superposed body is transported in an inclined manner so as to ascend from the support roller toward the suspension roller.

According to the present aspect, kinetic energy associated with travel of the separator or superposed body transported from the support roller toward the suspension roller can be converted into potential energy to apply a brake. As a result, even when the separator is pulled in abruptly in the zigzag folding step, the separator can be stopped satisfactorily at a predetermined position.

Effects of the Invention

According to the present invention, the separator or superposed body (will hereinafter be referred to as "separator or the like") is formed into zigzag folds by suspending the separator or the like in a continuous state between the guide members of the zigzag folding means, and moving the guide members while keeping the separator or the like in a substantially tension-free state. Thus, the phenomenon in which, when the separator or the like is pulled in by the guide members, the separator or the like moves in the width direction and flutters is suppressed, whereby the pulling-in of the separator or the like by the guide members can be carried out smoothly. As a result, even if some variation exists in the width, thickness and surface condition of the separator or the like, the accuracy of the resulting electrode plate group can be sufficiently maintained within the tolerance range, thus contributing to the improvement of quality.

Furthermore, the separator or the like need not be cut to a predetermined length before being zigzag-folded, but can be subjected to a predetermined zigzag folding operation in a continuous state. Thus, the yield of the separator or the like can be increased to as high a level as possible.

MODE FOR CARRYING OUT THE INVENTION

The embodiment of the present invention will now be described in detail based on the accompanying drawings.

Figure 1:
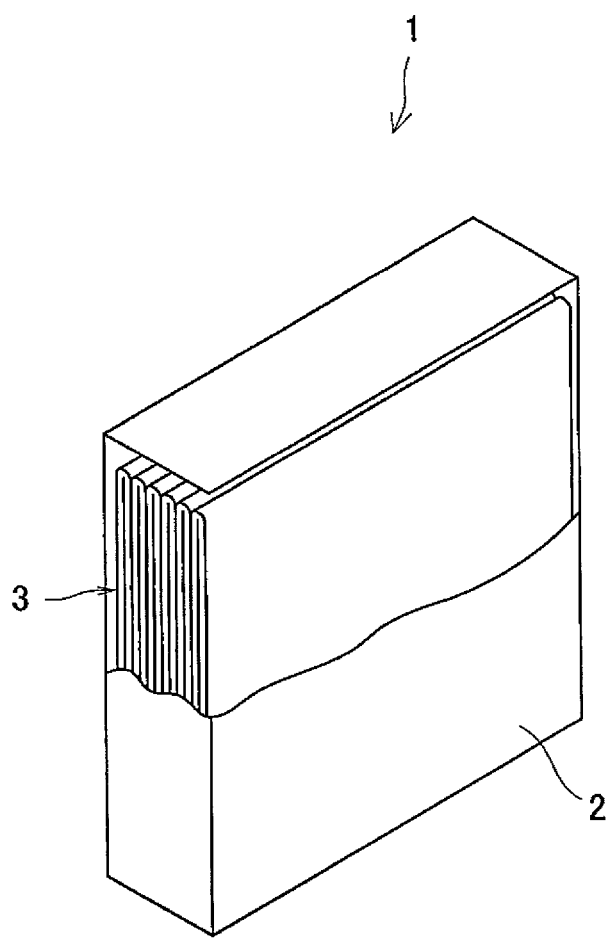
FIG. 1 is a perspective view showing the outline of a square battery housing an electrode plate group according to an embodiment of the present invention.
Figure 2:
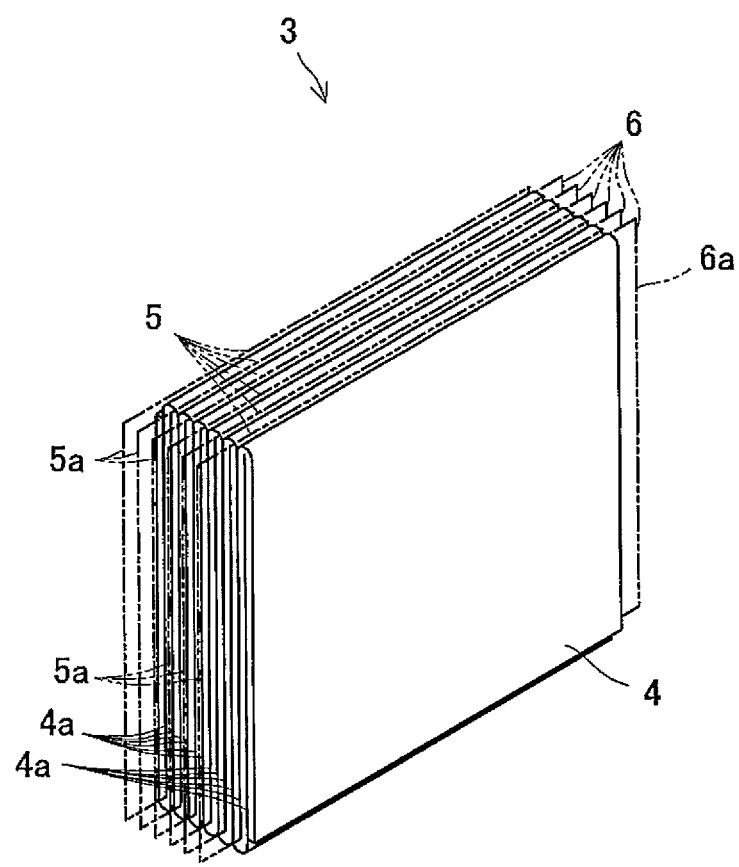
FIG. 2 is a perspective view showing the schematic configuration of the electrode plate group illustrated in FIG. 1.

As shown in FIGS. 1 and 2, a square battery (secondary battery) 1, which is a lithium ion secondary battery, has a square case 2, and an electrode plate group 3 is accommodated within the square case 2. A positive electrode terminal and a negative electrode terminal (not shown) are provided at predetermined locations of the square case 2. The interior or the square case 2 is also charged with an electrolytic solution comprising a lithium salt blended with an organic solvent.

The electrode plate group 3 includes a zigzag-folded separator 4, and electrode plates of one type (e.g., positive electrode plates 5) and electrode plates of another type (e.g., negative electrode plates 6) inserted alternately into respective folds 4a of the separator 4. The positive electrode plates 5 and the negative electrode plates 6 are alternately superposed on each other such that the separator 4 is interposed between the positive electrode plate 5 and the negative electrode plate 6, and the separator 4 is in a flatly folded state. Each positive electrode plate 5 and each negative electrode plate 6, respectively, have a lead portion 5a and a lead portion 6a protruding from the separator 4 to sides opposite to each other, and the lead portions 5a and 6a of the electrodes are bundled together, respectively. The bundled lead portions 5a of the positive electrode plates 5 are connected to the positive electrode terminal, while the bundled lead portions 6a of the negative electrode plates 6 are connected to the negative electrode terminal.

The electrode plate group 3 of the above-described configuration is produced by a manufacturing apparatus for a secondary battery. A manufacturing apparatus according to the present embodiment has an electrode plate group manufacturing means I composed of a zigzag folding means and an electrode plate insertion means for producing the electrode plate group 3 by zigzag-folding the separator 4; and a separator supply means II for supplying the separator 4 to be zigzag-folded. FIGS. 3(a), 3(b) are views showing the electrode plate group manufacturing means I, in which FIG. 3(a) is a plan view of the means I and FIG. 3(b) is its front view. As shown in these drawings, a zigzag folding means 20 has a plurality of guide bars (guide members) 21 arranged zigzagging in the vertical direction. As will be described in detail later, the separator 4 is disposed between one row 22A and another row 22B of the guide bars 21, and the guide bars 21 are crossed in the horizontal direction between the rows 22A and 22B to zigzag-fold the separator 4.

The number of the guide bars 21 provided is equal to or larger than the number of the positive electrode plates 5 and the negative electrode plates 6 supplied to the separator 4. The plurality of guide bars 21 are each arranged horizontally as the two rows 22A and 22B placed in the vertical direction on a pedestal (not shown). The respective guide bars 21 are also arranged zigzagging between the rows 22A and 22B, namely, zigzag in the vertical direction. These guide bars 21 are each supported in a cantilever manner by longitudinal frames 23, 24 provided in the rows 22A, 22B, respectively.

The zigzag folding means 20 is also equipped with a drive unit for moving the guide bars 21 in the horizontal direction to cross them between the rows 22A and 22B, thereby zigzag-folding the separator 4. This drive unit is constituted, for example, by a ball screw and a motor for rotating the ball screw. The drive unit composed of the ball screw and the motor in this manner is an ordinary feed means, and thus its illustration is omitted.

Figure 3:
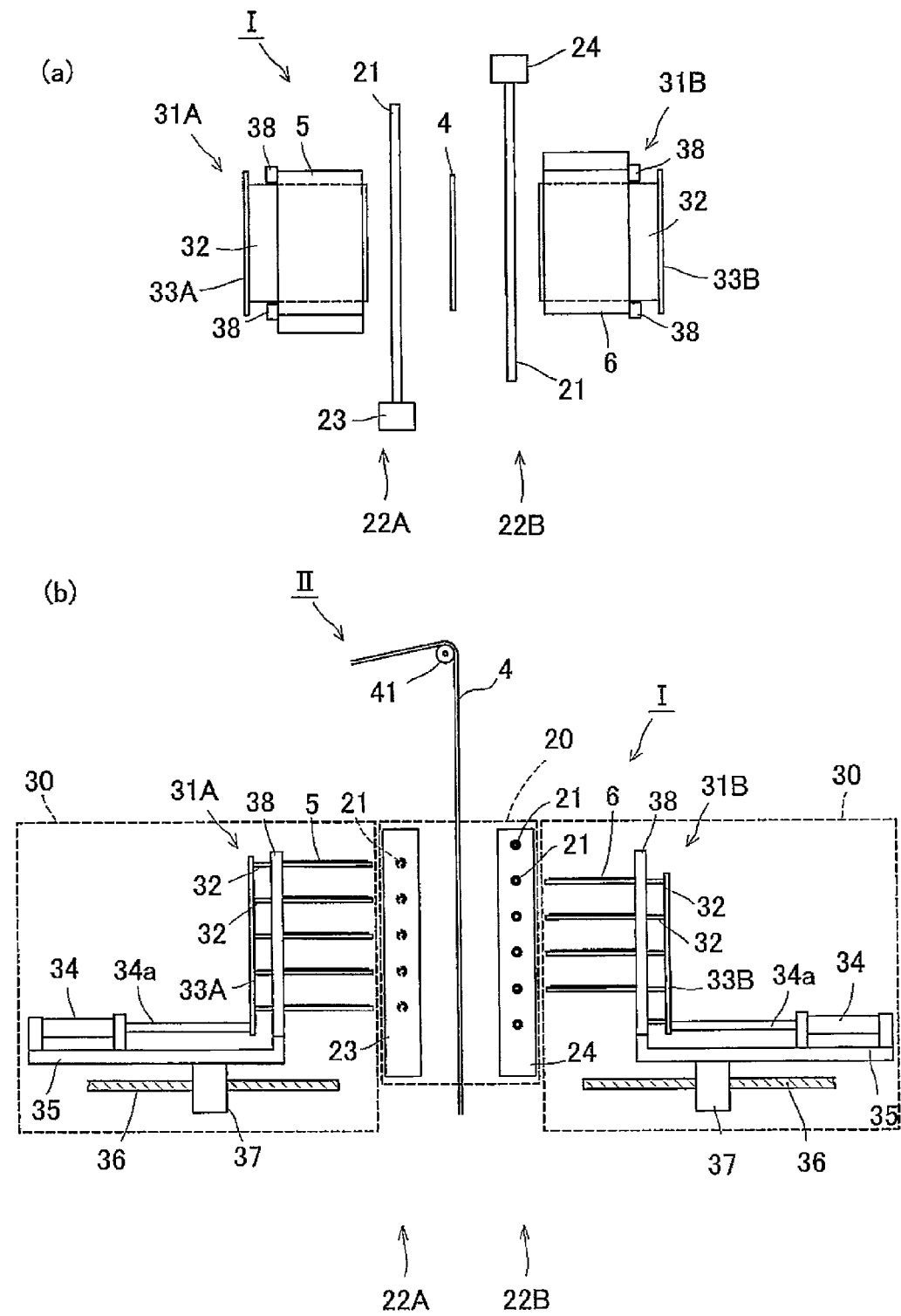
FIGS. 3(a), 3(b) are views showing an electrode plate group manufacturing means in a secondary battery manufacturing apparatus according to the embodiment of the present invention, FIG. 3(a) being a plan view of the means, and FIG. 3(b) being a front view thereof.

An electrode plate insertion means 30 is provided with a pair of electrode plate transport members 31 (31A, 31B) disposed behind the rows 22A, 22B of the guide bars 21 constituting the zigzag folding means 20. Each electrode plate transport member 31 has a plurality of electrode plate transport trays 32 on which a predetermined number of the positive electrode plates 5 or the negative electrode plates 6 are placed. In FIGS. 3(*a*), 3(*b*), the positive electrode plates 5 are placed on the electrode plate transport trays 32 of the electrode plate transport member 31A located to the left of the separator 4, while the negative electrode plates 6 are placed on the electrode plate transport trays 32 of the electrode plate transport member 31B located to the right of the separator 4. By moving these electrode plate transport trays 32 into the folds 4*a* (see FIG. 2) formed in the separator 4 in synchronization with the movement of the guide bars 21 in the horizontal direction, the electrode plate insertion means 30 inserts the positive electrode plates 5 and the negative electrode plates 6 alternately into the folds 4*a*.

In the present embodiment, the electrode plate insertion means 30 is equipped with the first electrode plate transport member (e.g., electrode plate transport member for a positive electrode plate) 31A for transporting the electrode plate of one type (e.g., positive electrode plate 5), and the second electrode plate transport member (e.g., electrode plate transport member for a negative electrode plate) 31B for transporting the electrode plate of another type (e.g., negative electrode plate 6). The first electrode plate transport member 31A has the same number of the electrode plate transport trays 32 as the number of the one type electrode plates (e.g., positive electrode plates 5) necessary for the electrode plate group 3. The respective electrode plate transport trays 32 of the first electrode plate transport member 31A are arranged behind the guide bars 21 constituting the row 22A such that the electrode plate loading surface of each electrode plate transport tray 32 is horizontal, and the rear ends of the electrode plate transport trays 32 are coupled together by a support frame 33A. Similarly, the second electrode plate transport member 31B has the same number of the electrode plate transport trays 32 as the number of the other type electrode plates (e.g., negative electrode plates 6) necessary for the electrode plate group 3. The respective electrode plate transport trays 32 of the second electrode plate transport member 31B are arranged behind the guide bars 21 constituting the other row 22B such that the electrode plate loading surface of each electrode plate transport tray 32 is horizontal, and the rear ends of the electrode plate transport trays 32 are coupled together by a support frame 33B.

Each of the support frames 33A, 33B is coupled to a piston rod 34*a* of a piston cylinder device 34 capable of extending and contracting in the transport direction of the positive electrode plate 5 as the one type electrode plate or the negative electrode plate 6 as the other type electrode plate. Each piston cylinder device 34 is installed on a carriage 35 capable of reciprocating in the transport direction of the positive electrode plate 5 or the negative electrode plate 6.

Each carriage 35 is configured to be movable in the horizontal direction by the drive unit composed of a ball screw, etc. Concretely, each carriage 35 is coupled to a nut 37 threadedly engaged with a screw shaft 36, which is a feed screw, installed rotatably on the pedestal (not shown). The screw shaft 36 is rotated by the motor (not shown). When the screw shaft 36 is rotated, each of the first and second electrode plate transport members 31A and 31B is moved toward or away from the separator 4 in accordance with the direction of rotation.

Push members 38 as a pair to be brought into contact with the edge of the electrode plate placed on the electrode plate transport tray 32 are provided on the right and left sides of the electrode plate transport tray 32 of each of the first and second electrode plate transport members 31A and 31B (i.e., on both sides in a direction which is horizontal to the electrode plate loading surface and perpendicular to the moving direction of the electrode plate transport tray 32). The push members 38 are concretely configured as a pair of longitudinal bars contacting edge parts of each of the positive electrode plate 5 and the negative electrode plate 6 protruding from the right and left sides of each electrode plate transport tray 32, and are attached to each carriage 35.

The separator 4 is suspended between the opposing rows 22A and 22B of the guide bars 21 of the zigzag folding means 20 via a suspension roller 41 of the separator supply means II.

Figure 4:
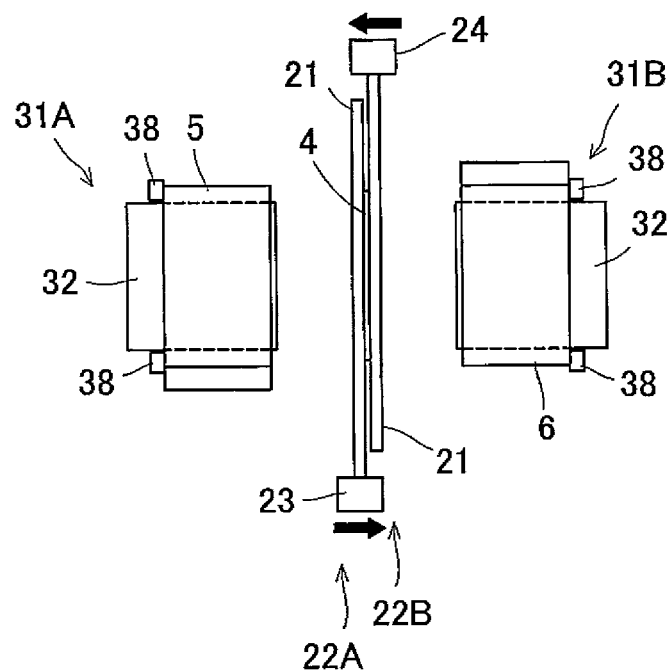
FIGS. 4(a), 4(b) are schematic views showing modes during a zigzag folding step for a separator using the manufacturing apparatus shown in FIGS. 3(a), 3(b).
Figure 4:
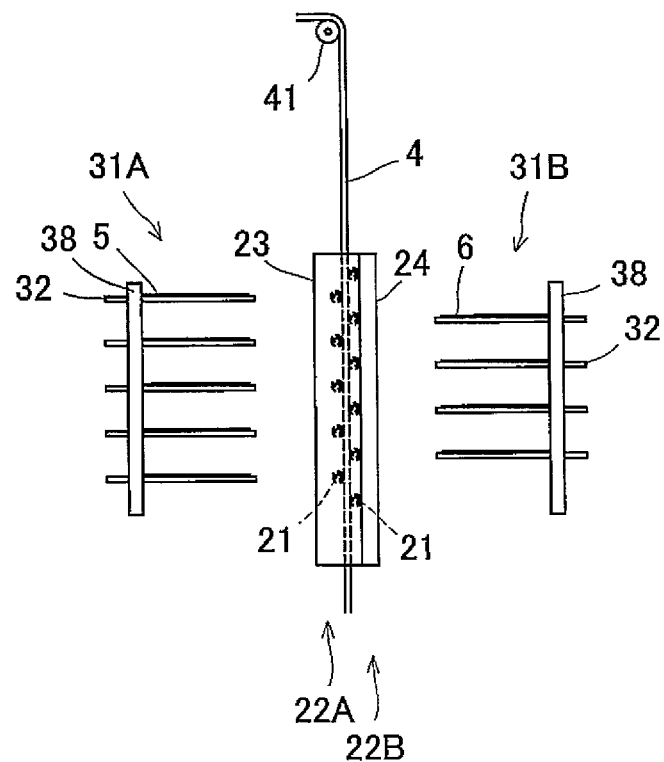
Figure 5:
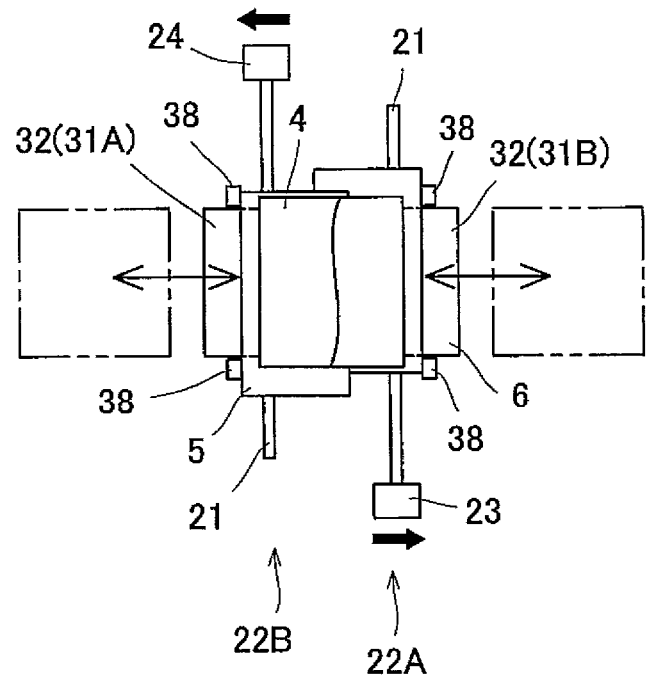
FIGS. 5(a), 5(b) are schematic views showing other modes during the zigzag folding step for a separator using the manufacturing apparatus shown in FIGS. 3(a), 3(b).
Figure 5:
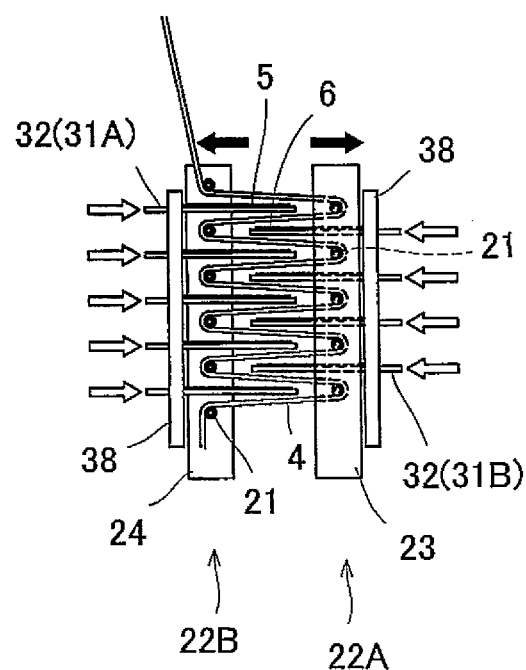

A mode for producing the electrode plate group 3 using the above-described electrode plate group manufacturing means I will be described. FIGS. 4(*a*), 4(*b*) and 5(*a*), 5(*b*) are schematic views showing modes halfway through the zigzag folding step for the separator using the electrode plate group manufacturing means I shown in FIGS. 3(*a*), 3(*b*). As shown in FIGS. 4(*a*), 4(*b*), the separator 4 is suspended between the rows 22A and 22B of the guide bars 21 arranged zigzagging and, in this state, the rows 22A and 22B of the guide bars 21 are moved horizontally toward the separator 4 to cross the guide bars 21 between the rows 22*a* and 22B, as shown in FIGS. 5(*a*), 5(*b*). At this time, buffer rollers of the separator supply means II are moved upward in synchronism with this action to supply the separator 4 of a length pulled in by the guide bars 21, although this is not illustrated. Thus, such pulling-in of the separator 4 by the guide bars 21 is performed smoothly, with the separator 4 being in a substantially tension-free state. This motion of the separator supply means II will be described in detail later.

In synchronization with the movement of the guide bars 21 in the horizontal direction, the carriages 35 are moved by the rotations of the screw shafts 36. In accordance with these motions, the first and second electrode plate transport members 31A, 31B and the push members 38 are moved toward the separator 4. The start of the movement of each carriage 35 may be simultaneous with the start of movement of the guide bars 21, or during movement of the guide bars 21 after the start of movement of the guide bars 21, or simultaneous with or a predetermined time after the completion of movement of the guide bars 21. In consideration of the tact time, it is desirable that the movement of each carriage 35 be started simultaneously with the start of movement of the guide bars 21, or a short time after the start of movement of the guide bars 21, but in the process of movement of the guide bars 21. It is recommendable to detect this timing and carry out the above movement synchronized with the timing. That is, the guide bars 21 are moved in the horizontal direction so as to be crossed between the rows 22A and 22B, whereupon the first and second electrode plate transport members 31A, 31B and the push members 38 are moved in the horizontal direction toward the folds 4*a* formed in the separator 4. In this manner, the positive electrode plates 5 loaded beforehand on the electrode plate transport trays 32 of the first electrode plate transport member 31A, and the negative electrode plates 6 loaded beforehand on the electrode plate transport trays 32 of the second electrode plate transport member 31B are alternately inserted into the folds 4*a* of the zigzag-folded separator 4. As a result, a layered body having the positive electrode plates 5 and the negative electrode plates 6 alternately superposed on each other via the separator 4 is formed. Then, the guide bars 21 are pulled out of the respective folds 4*a* of the separator 4, and the first and second electrode plate transport members 31A and 31B are moved away from the separator 4, with the push members 38 remaining. Thus, the positive electrode plates 5 and the negative electrode plates 6 are left in the folds 4a of the separator 4, whereby the layered body having the positive electrode plates 5 and the negative electrode plates 6 alternately stacked via the separator 4 is formed. Such a layered body is pressed in the stacking direction of the positive electrode plates 5 and the negative electrode plates 6 by a predetermined press means (not shown) for integration, whereby the electrode plate group 3 is formed.

Figure 6:
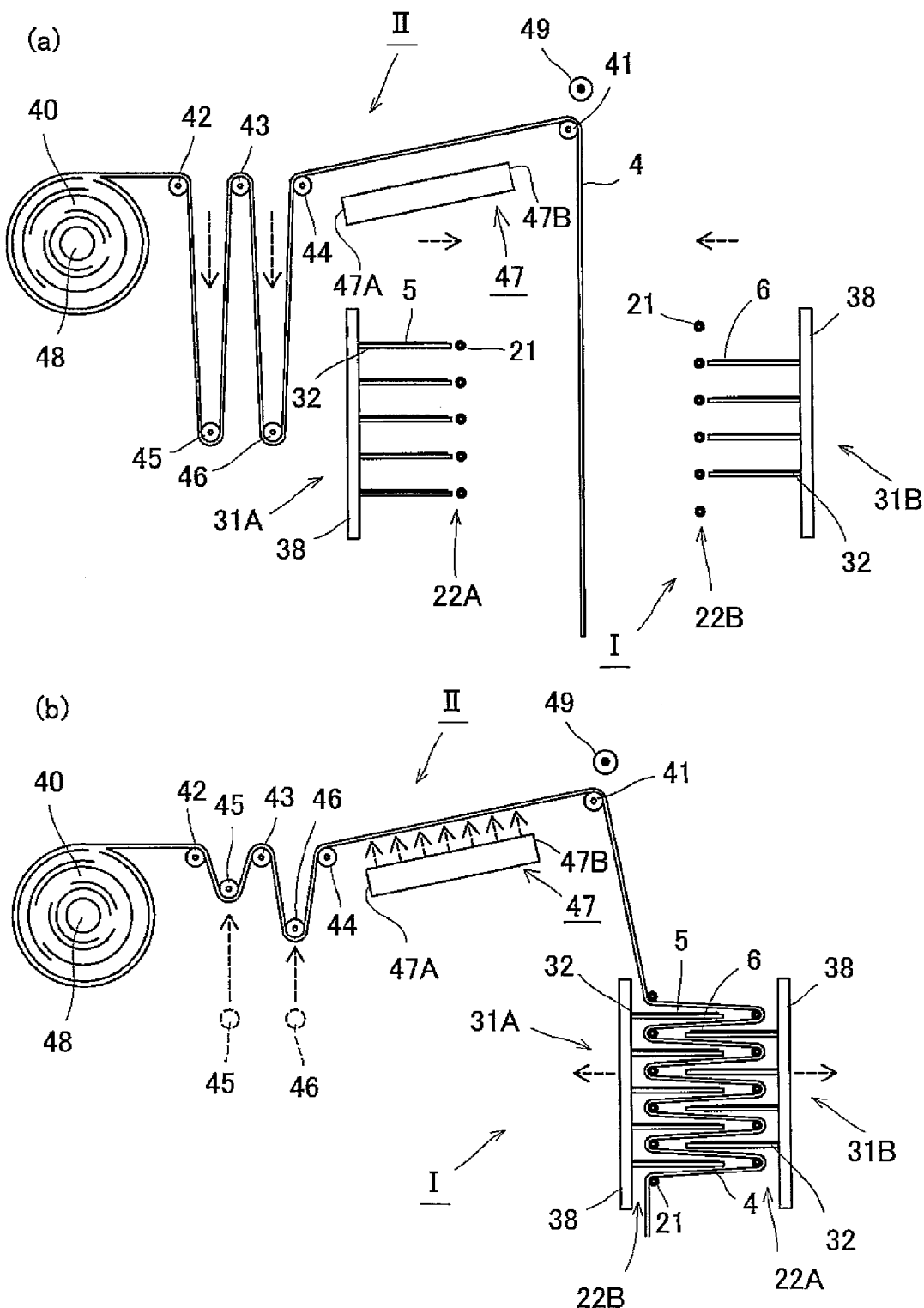
FIGS. 6(a), 6(b) are schematic views showing a separator supply means, in relation to the electrode plate group manufacturing means, in the secondary battery manufacturing apparatus according to the embodiment of the present invention, FIG. 6(a) showing the mode of a step prior to the separator zigzag folding, and FIG. 6(b) showing the mode of the zigzag folding step.

FIGS. 6(a), 6(b) are schematic views showing the separator supply means II in the secondary battery manufacturing apparatus according to the present embodiment in relation to the electrode plate group manufacturing means I, FIG. 6(a) showing the mode of a step prior to zigzag folding of the separator 4, and FIG. 6(b) showing the mode of the zigzag folding step. As shown in FIG. 6(a), in this state, the rows 22A and 22B of the guide bars 21 are spaced from each other, and the separator 4 is suspended between them via the suspension roller 41. Here, the separator 4 is rotatably supported around a rotating shaft 48 as a roll member 40 wound in a roll form. Between the roll member 40 and the suspension roller 41, there are provided support rollers 42, 43, 44, and buffer rollers 45, 46 formed to have central axes whose positions are movable vertically. The buffer rollers 45, 46 are arranged between the support rollers 42, 43, 44 and, as shown in FIGS. 6(a), 6(b), the support rollers 42, 43, 44 and the buffer rollers 45, 46 are arranged alternately in the horizontal direction of the drawings. Moreover, a movable roller 49, which is moved toward the suspension roller 41 to hold the separator between it and the suspension roller 41, is also shown in the drawings. The motion and role of the movable roller 49 will be described later.

FIG. 6(b), on the other hand, shows a state in which the rows 22A and 22B of the guide bars 21 are moved toward each other to zigzag-fold the separator 4, and the positive electrode plates 5 and the negative electrode plates 6 are alternately inserted between the parts of the separator 4 folded in a zigzag. At this time, the buffer rollers 45, 46 are allowed to ascend from the lowermost descending position shown in FIG. 6(a) to the uppermost ascending position in synchronism with the movement of the rows 22A, 22B of the guide bars 21. In accordance with such ascent of the buffer rollers 45, 46, the length of the separator 4 ranging from the support roller 44 to the front end via the suspension roller 41 is supplied with an excess length. That is, the excess length of the separator 4 held by the support rollers 42, 43, 44 and the buffer rollers 45, 46 when the buffers rollers 45, 46 are lowered to the lowermost descending position corresponds to the amount of the separator 4 pulled in horizontally by the guide bars 21 during zigzag folding of the separator 4. If, as a result, the amount of the separator 4 pulled in during zigzag folding is up to twice the ascent distance of the buffer rollers 45, 46 from the state shown in FIG. 6(a) to the state shown in FIG. 6(b), the separator 4 is pulled in smoothly in a substantially tension-free state and zigzag-folded. Here, the present embodiment is described as having the two buffer rollers 45, 46, but there are no particular restrictions on the number of the buffer rollers. Any configuration would be acceptable in which the product of the stroke of each buffer roller during vertical movement and the number of the buffer rollers is sufficient to ensure the dimension of the separator 4 pulled in horizontally by the guide bars 21 during zigzag folding of the separator 4.

In the present embodiment, as described above, the buffer roller 45 formed to be vertically movable is disposed between the support rollers 42 and 43, and the buffer roller 46 similarly formed to be vertically movable is disposed between the support rollers 43 and 44, whereby a buffer section securing the amount of the separator 4 pulled in during the zigzag folding step is formed.

In the present embodiment, moreover, an air blowing means 47 is disposed in a space facing the lower surface of the separator 4 between the support roller 44 and the suspension roller 41. Air is blown at the lower surface of the separator 4 by the air blowing means 47 to support the separator 4 from below in a non-contact manner. The air blown is ionized air exhibiting the effect of preventing or eliminating static electrification of the separator 4 being transported. Furthermore, the support roller 44 in the present embodiment is disposed such that its position in the vertical direction is lower than the position of the suspension roller 41 in the vertical direction. In conformity with this disposition, the air blowing means 47 is disposed to be inclined upwardly to the right, with its downstream side 47B as a discharge side for the separator being positioned above its upstream side 47A as a supply side for the separator, so that the air blowing surface thereof parallels the lower surface of the separator 4.

Such an air blowing means 47 is not absolutely necessary, but the adoption of such a non-contact structure can exclude a part of physical contact with the separator 4, such as in the case of support for the separator 4 by a roller. Incidentally, as the separator 4 is pulled out of the roll member 40, contacted with the rollers, and transported to the electrode plate group manufacturing means I, the separator 4 is statically electrified by friction associated with pulling-out or contact with the rollers. If the separator 4 remains electrically charged, the separator 4 contacts a guide portion (not shown), which serves to regulate the transport direction during transport of the separator 4, because of static electricity, with the result that the separator fails to be transported in the correct direction. Alternatively, the adjacent parts of the separator 4 are attracted to each other, so that the pulling-in of the separator 4 by the movement of the guide bars 21 cannot be performed smoothly. Hence, a gas for preventing static buildup and performing static elimination, such as ionized air, is used as a blowing gas, and blown at the separator 4. By so doing, static buildup of the separator 4 can be prevented, and the electrostatically charged separator 4 can be rid of static electricity. Blowing of air from the air blowing means 47 may be always performed, or may be optionally controlled, such as by blowing at the time of, and before and after, transport of the separator 4, and stopping blowing for a certain period when the separator 4 is not transported. Constant blowing permits reliable removal of static electricity of the entire separator 4 being transported, and thus can be expected to suppress mutual attraction of the adjacent parts of the separator 4 more reliably. Controlled blowing according to the status of transport can reduce unnecessary blowing operations for ionized air, and can also minimize the possibility of causing problems, such as deformation of the separator 4 due to blowing of ionized air for a long time at the same location.

In the present embodiment, as described earlier, the separator 4 is inclined so as to rise in position from the support roller 44 toward the suspension roller 41, but the adoption of such a configuration is arbitrary. By tilting the separator 4 as above, however, the separator 4 can be braked when being pulled into the electrode plate group manufacturing means I via the suspension roller 41. That is, when the separator 4 is pulled in according to the horizontal movement of the guide bars 21 during the zigzag folding step, such pulling-in takes place, with the separator 4 being in a substantially tension-free state. Thus, the separator 4 accelerated by the pulling-in motion cannot come to a halt even upon completion of the pull-in motion, and may travel past a predetermined stop position. In order to prevent such an excessive travel, the present embodiment is configured such that the separator 4 is transported from the support roller 44 toward the suspension roller 41 in a rightwardly upward direction in the drawings. This configuration provides a structure in which the kinetic energy of the separator 4 pulled in via the suspension roller 41 is converted into a potential energy based on a difference in vertical height between the support roller 44 and the suspension roller 41 to apply a brake.

Figure 7:
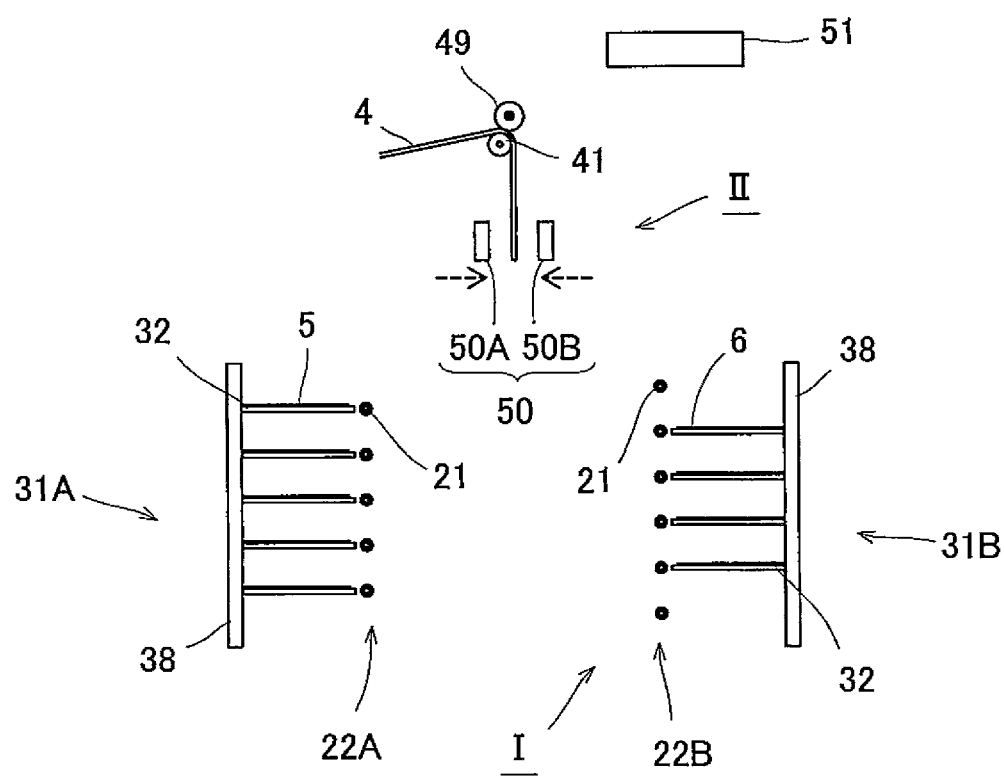
FIG. 7 is a schematic view showing a secondary battery manufacturing method using the manufacturing apparatus according to the embodiment of the present invention.

A secondary battery manufacturing method using the secondary battery manufacturing apparatus according to the present embodiment will be explained based on FIGS. 7 to 14. FIG. 7 is a schematic view showing a method for manufacturing an electrode plate group with the use of the secondary battery manufacturing apparatus according to the present embodiment. This drawing shows an initial state after completion of the production of the electrode plate group 3 in the preceding step. In such an initial state, a leading end part of the separator 4 cut in the preceding step is suspended from the suspension roller 41. At this time, the movable roller 49 is moved in the direction of the suspension roller 41. With the separator 4 being held between the suspension roller 41 and the movable roller 49, in the separator supply means II, the roll member 40 rotates along with the descending of the buffer rollers 45, 46 (see FIGS. 6(a), 6(b); the same applies hereinafter) to pay off the separator 4, whereupon the state shown in FIG. 6(a) is achieved. At this time, the opposing rows 22A and 22B of the electrode plate group manufacturing means I are spaced from each other.

Figure 8:
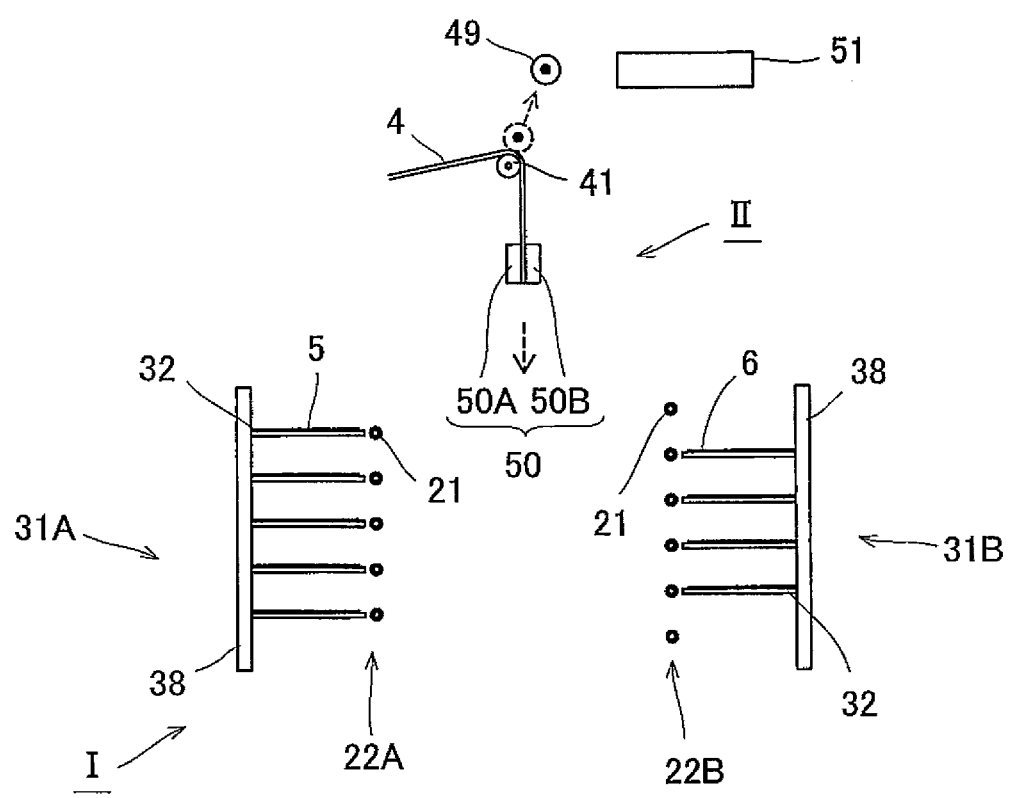
FIG. 8 is a schematic view showing the secondary battery manufacturing method using the manufacturing apparatus according to the embodiment of the present invention.

From this state, the movable roller 49 is moved away from the suspension roller 41, and the leading end part of the separator 4 is held by a clamp 50 consisting of clamp members 50A and 50B disposed on both sides of the separator 4, as shown in FIG. 8. A pressing member 51 is used to form the electrode plate group 3 by applying a pressing treatment to a layered body of the separator 4, which comprises the electrode plates inserted into folds of the zigzag-folded separator 4, in cooperation with a pressing member 52 shown in FIG. 11.

Figure 9:
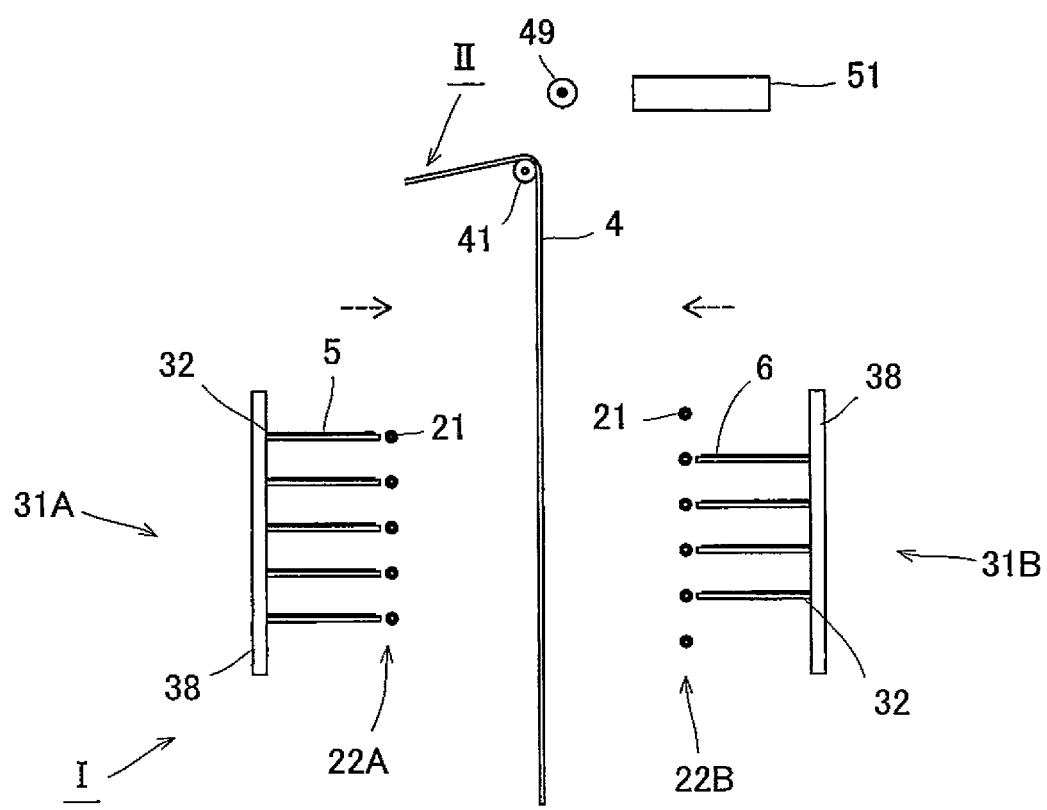
FIG. 9 is a schematic view showing the secondary battery manufacturing method using the manufacturing apparatus according to the embodiment of the present invention.

Then, while the roll member 40 is being rotated in the state of FIG. 6(a) to pay off the separator 4, the clamp 50 (not shown in FIG. 9) is moved downward, with the leading end part of the separator 4 being clamped, to lower the separator 4 so as to place it between the rows 22A and 22B, as shown in FIG. 9. Then, the clamp members 50A, 50B are separated from the separator 4 to liberate the separator 4 from the clamped state. Then, the clamp 50 moves to a face side or a back side of FIG. 9 and ascends to be prepared for a subsequent treatment, although this is not illustrated.

Figure 10:
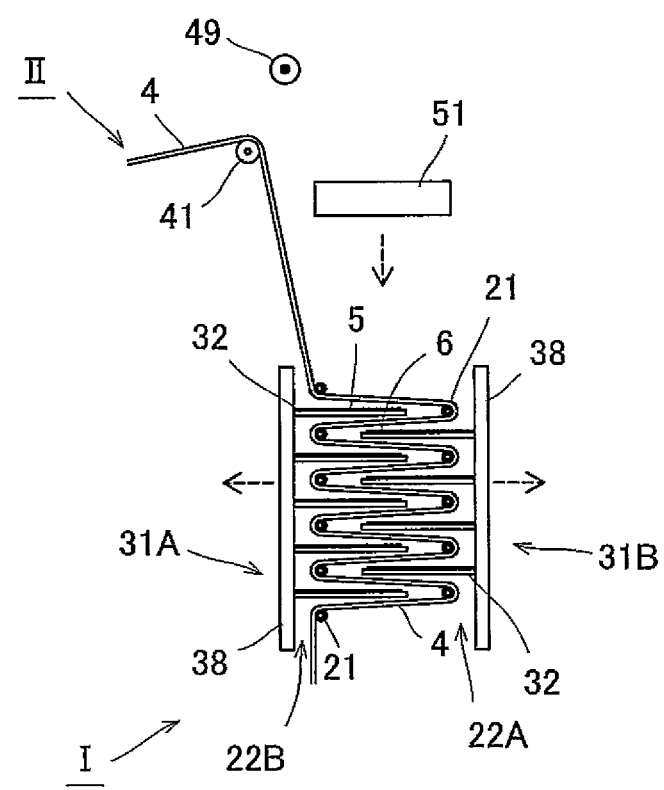
FIG. 10 is a schematic view showing the secondary battery manufacturing method using the manufacturing apparatus according to the embodiment of the present invention.

From this state, the respective guide bars 21 are moved in the horizontal direction and crossed between the rows 22A and 22B of the guide bars 21, as shown in FIG. 10. In synchronism with this motion, the buffer rollers 45, 46 of the separator supply means II are moved upwards. Upon this movement, the separator 4 of a length twice the sum of the amounts of ascents of the buffer rollers 45 and 46 can be paid off as an excess length, so that the separator 4 of a length corresponding to the length pulled in by the guide bars 21 is supplied. Thus, the pulling-in and zigzag folding of the separator 4 by the guide bars 21 are performed smoothly in a substantially tension-free state of the separator 4. According to the present embodiment, in particular, the separator 4 is shaped in continuous zigzag folds without being cut off from the separator supply means II. Thus, the phenomenon of the separator 4 moving in the width direction and fluttering while being pulled in by the guide bars 21 can be kept to a minimum.

Figure 11:
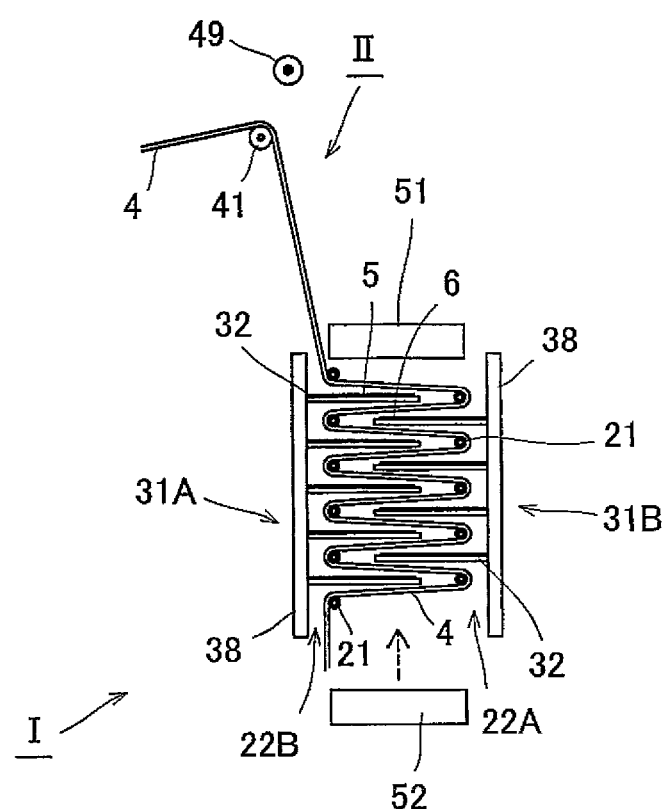
FIG. 11 is a schematic view showing the secondary battery manufacturing method using the manufacturing apparatus according to the embodiment of the present invention.

After zigzag folding of the separator 4 is completed, the positive electrode plates 5 and the negative electrode plates 6 are alternately inserted between the parts of the zigzag-folded separator 4 to form a layered body comprising the separator 4 and the positive electrode plates 5 and negative electrode plates 6 sandwiching the separator 4, in the same mode as explained based on FIGS. 5(a), 5(b). Simultaneously, the pressing member 51 is lowered from above the layered body, and brought into contact with the upper surface of the layered body to bring about a state as illustrated in FIG. 11.

In the state shown in FIG. 11, a similar pressing member 52 is raised from below and contacted with the lower surface of the layered body.

Figure 12:
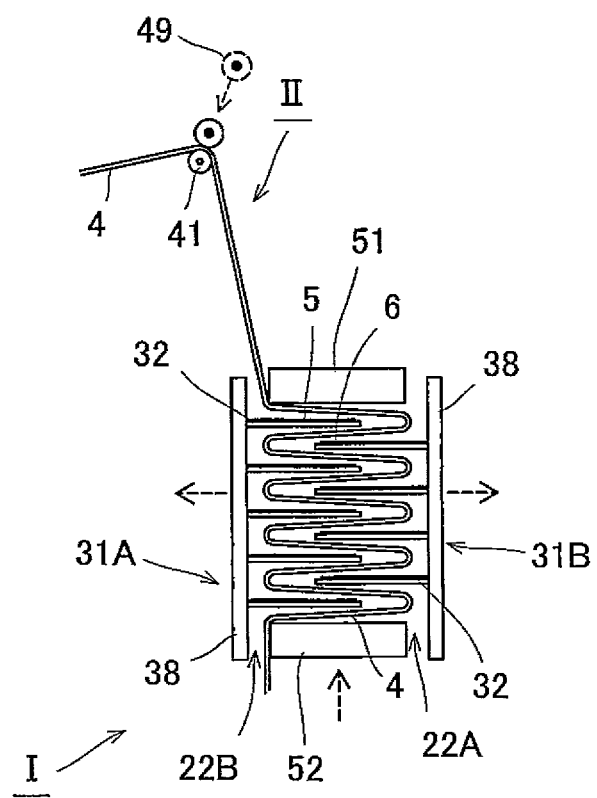
FIG. 12 is a schematic view showing the secondary battery manufacturing method using the manufacturing apparatus according to the embodiment of the present invention.
Figure 13:
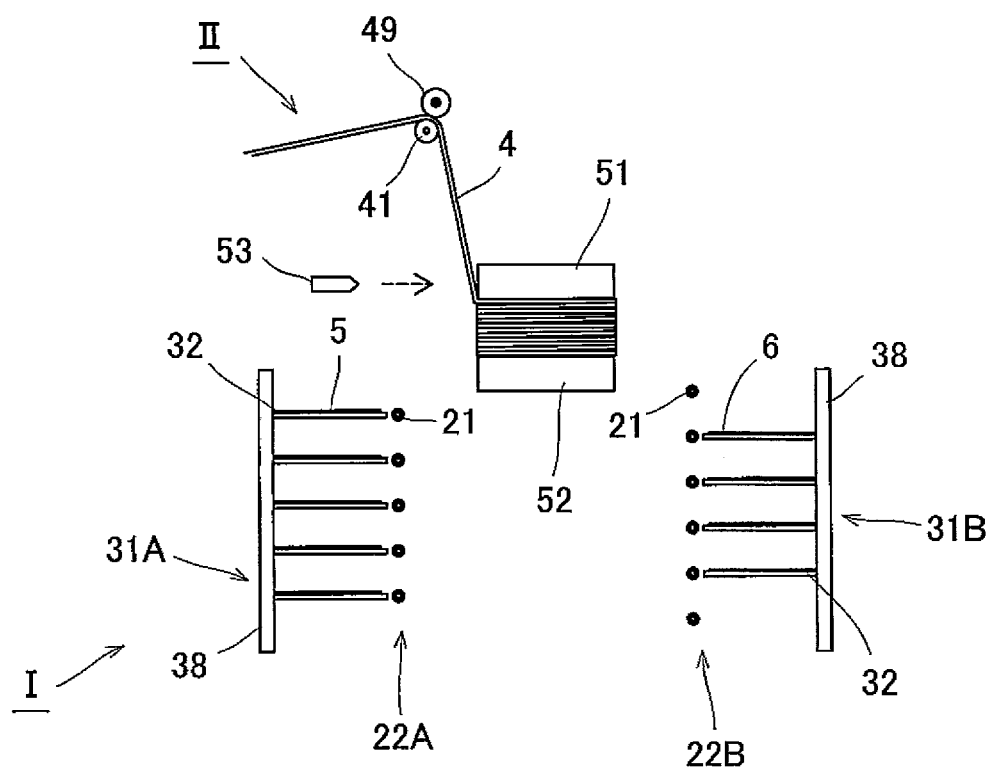
FIG. 13 is a schematic view showing the secondary battery manufacturing method using the manufacturing apparatus according to the embodiment of the present invention.

As a result, the layered body is compressed from above and from below using the pressing members 51, 52, as shown in FIG. 12. From this state, the guide bars 21 are retreated, and the first and second electrode plate transport members 31A, 31B are also retreated. Then, the layered body is raised while being sandwiched between the pressing members 51 and 52, and the movable roller 49 is moved in the direction of the suspension roller 41 to hold the separator 4 between the suspension roller 41 and the movable roller 49. Then, as shown in FIG. 13, the trailing end of the separator 4 is cut at an upper predetermined position by means of a cutter 53. The cut-off layered body is formed into the electrode plate group 3 as a product.

Figure 14:
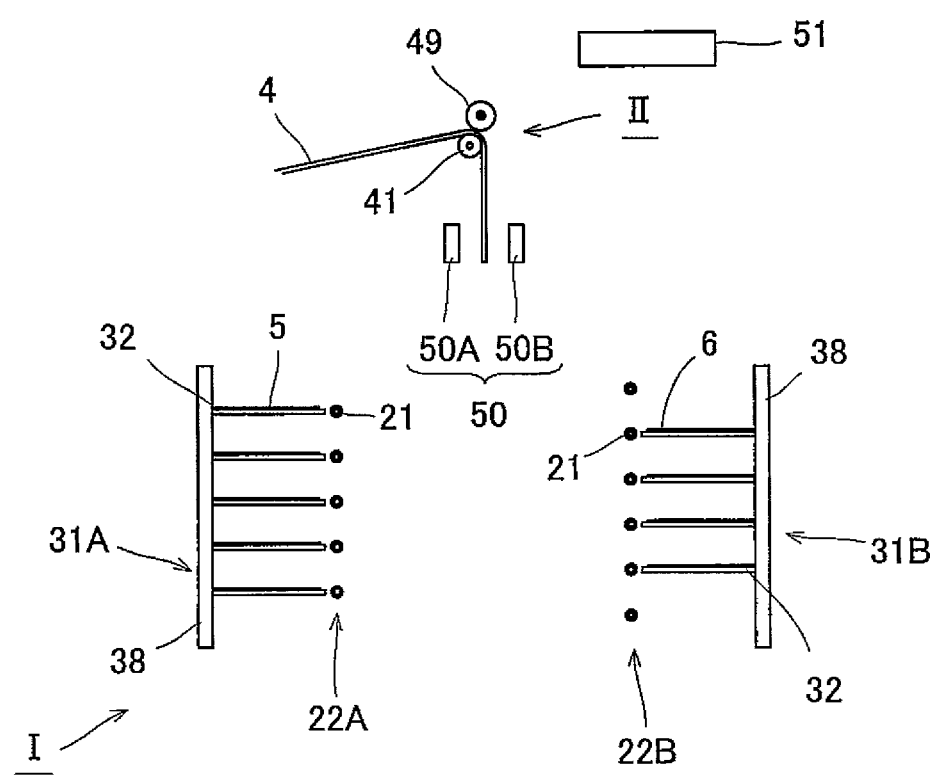
FIG. 14 is a schematic view showing the secondary battery manufacturing method using the manufacturing apparatus according to the embodiment of the present invention.

Upon cutting-off of the layered body, the clamp members 50A, 50B are moved to a position where they can hold therebetween a leading end part of the separator 4, as shown in FIG. 14, whereby the electrode plate group manufacturing means I is brought into an initial state similar to that shown in FIG. 7. On the other hand, the separator supply means II has the buffer rollers 45, 46 located at the ascending position, although this is not illustrated. From this state, therefore, the buffer rollers 45, 46 are lowered, with the roll member 40 being rotated, to pay off the separator 4, thereby bringing about the initial state (the state in FIG. 7).

Figure 15:
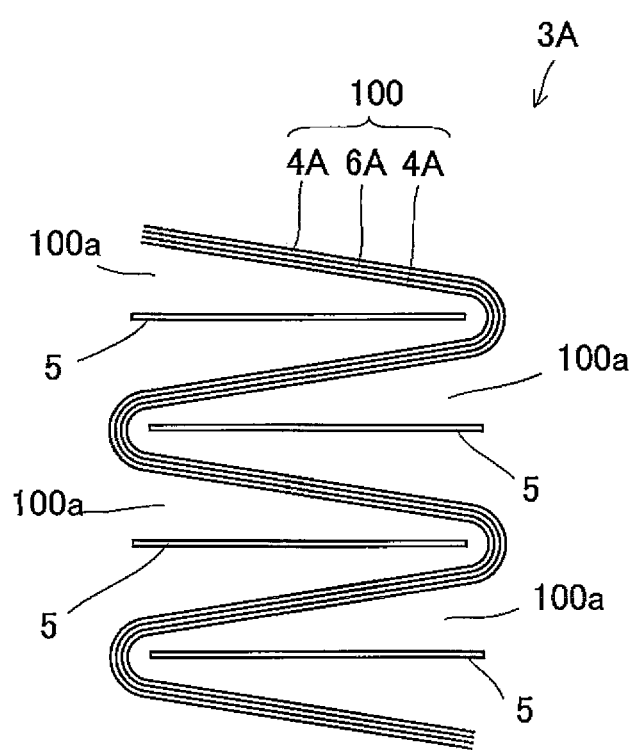
FIG. 15 is a schematic view showing another electrode plate group to be produced by the manufacturing apparatus according to the embodiment of the present invention.

FIG. 15 is a schematic view showing an electrode plate group in another embodiment of the present invention. As shown in the drawing, an electrode plate group 3A in the present embodiment is constituted as a layered body comprising a zigzag-folded continuous superposed body 100, and positive electrode plates 5 inserted into folds 100a of the superposed body 100. The superposed body 100 is a layered body formed by sandwiching a negative electrode plate 6A between two separators 4A. Thus, the positive electrode plates 5 inserted into the folds 100a of the superposed body 100 face the negative electrode plate 6A via the separator 4A.

In the above-mentioned configuration of the present embodiment as well, the positive electrode plate 5 and the negative electrode plate 6A are provided with lead portions 5a and 6a protruding from the separator 4A in directions opposite to each other (see FIG. 2), as in the aforementioned embodiment explained based on FIGS. 3(a), 3(b) to FIG. 14. The lead portions 5a, 6a of the respective electrodes are bundled together, and connected to a positive electrode terminal and a negative electrode terminal (not shown), respectively, in a square case 2 (see FIG. 1).

A manufacturing apparatus for producing such an electrode plate group 3A is basically of the same configuration as that of the aforementioned embodiment shown in FIGS.

3(a), 3(b). However, the superposed body 100 is supplied, instead of the separator 4, from the separator supply means II, and placed between the rows 22A and 22B of the guide bars 21 of the zigzag folding means 20. At the same time, each of the first and second electrode plate transport members 31A and 31B transports the positive electrode plates 5 into the folds 100a of the superposed body 100.

According to the present embodiment described above, it suffices to form in the superposed body 100 the folds 100a into which only the positive electrode plates 5 are inserted. Thus, if the electrode plate group 3A having the same performance as that of the electrode plate group 3 in the aforementioned embodiment is to be produced, the number of the folds 100a of the superposed body 100 may be a half of that in the aforementioned embodiment. Hence, the effects are exhibited that the numbers of the guide bars 21 and the electrode plate transport trays 32 can be decreased to almost half and, eventually, the tact time can be further shortened.

The superposed body 100 in the present embodiment is the laminate formed by sandwiching the negative electrode plate 6A between the two separators 4A, but may be a laminate formed by sandwiching the positive electrode plate, instead of the negative electrode plate 6A, between the two separators 4A. In this case, each of the first and second electrode plate transport members 31A and 31B transports the negative electrode plates 6 into the folds 100a of the superposed body 100.

INDUSTRIAL APPLICABILITY

The present invention can be used effectively in industrial fields for the production of emergency power supply systems utilizing secondary batteries as emergency power supply devices for electronic instruments, or in industrial fields for the production of electric vehicles utilizing secondary batteries as energy sources.

Explanations of Letters or Numerals
I Electrode plate group manufacturing means
II Separator supply means
1 Square battery
2 Square case
3 Electrode plate group
4 Separator
4a Folds
5 Positive electrode plate
6 Negative electrode plate
5a, 6a Lead portion
20 Zigzag folding means
21 Guide bar
23, 24 Longitudinal frame
30 Electrode plate insertion means
31 Electrode plate transport member
32 Electrode plate transport tray
33 Support frame
38 Push member
41 Suspension roller
42, 43, 44 Support roller
45, 46 Buffer roller
47 Air blowing means
47A Upstream side
47B Downstream side
50 Clamp
53 Cutter

The invention claimed is:

1. A secondary battery manufacturing method, comprising the steps of:

moving a plurality of rows of guide members arranged such that the rows of guide members oppose each other, with a suspended body comprising a separator being suspended between the rows via a suspension roller, thereby zigzag-folding the suspended body;

inserting at least one of positive electrode plates and negative electrode plates into respective folds of the zigzag-folded suspended body, thereby forming a layered body having at least one of the positive electrode plates and the negative electrode plates superposed on each other via the suspended body; and pulling the guide members out of the respective folds of the suspended body, and then pressing the layered body in a direction in which the electrode plates are superposed, thereby manufacturing an electrode plate group, wherein at least one buffer roller is disposed between at least two support rollers for supporting the suspended body at midpoints upstream, in a transport direction of the suspended body, of the suspension roller on a relatively upstream side and a relatively downstream side, the buffer roller making contact with one surface of the suspended body, and being arranged to be ascendable and descendable in a vertical direction, with the buffer roller being located at a predetermined ascending position or descending position while being kept in contact with the suspended body, the suspended body is suspended between the guide members via the suspension roller, and during the step of zigzag folding by movement of the guide members, the buffer roller descends or ascends.

2. A secondary battery manufacturing method, comprising the steps of:

moving a plurality of rows of guide members arranged such that the rows oppose each other, with a superposed body being suspended between the rows of guide members via a suspension roller, the superposed body comprising one of a positive electrode plate and a negative electrode plate sandwiched between two separators, thereby zigzag-folding the superposed body;

inserting the electrode plates other than the sandwiched one electrode plate into respective folds of the zigzag-folded superposed body, thereby forming a layered body having the positive electrode plate and the negative electrode plate alternately superposed on each other via the separator; and pulling the guide members out of the respective folds of the superposed body, and then pressing the layered body in a direction in which the positive or negative electrode plate and the negative or positive electrode plates are superposed, thereby manufacturing an electrode plate group, wherein at least one buffer roller is disposed between at least two support rollers for supporting the superposed body at midpoints upstream, in a transport direction of the superposed body, of the suspension roller on a relatively upstream side and a relatively downstream side, the buffer roller making contact with one surface of the superposed body, and being arranged to be ascendable and descendable in a vertical direction, with the buffer roller being located at a predetermined ascending position or descending position while being kept in contact with the superposed body, the superposed body is suspended between the guide members via the suspension roller, and during the step of zigzag folding by movement of the guide members, the buffer roller descends or ascends.

3. The secondary battery manufacturing method according to claim 1, wherein
between the most downstream support roller of the support rollers and the suspension roller, a gas is blown from below a lower surface of the suspended body moving therebetween to support the suspended body.

4. The secondary battery manufacturing method according to claim 2, wherein
between the most downstream support roller of the support rollers and the suspension roller, a gas is blown from below a lower surface of the superposed body moving therebetween to support the superposed body.

5. The secondary battery manufacturing method according to claim 3, wherein
the gas is ionized air.

6. The secondary battery manufacturing method according to claim 4, wherein
the gas is ionized air.

7. The secondary battery manufacturing method according to claim 1, wherein
between the most downstream support roller of the support rollers and the suspension roller, the suspended body is transported in an inclined manner so as to ascend from the support roller toward the suspension roller.

8. The secondary battery manufacturing method according to claim 2, wherein
between the most downstream support roller of the support rollers and the suspension roller, the superposed body is transported in an inclined manner so as to ascend from the support roller toward the suspension roller.

9. A secondary battery manufacturing apparatus, comprising:
zigzag folding means having a plurality of guide members arranged zigzagging in a vertical direction, and being adapted to zigzag-fold a suspended body, which is suspended between one row and another row of the guide members via a suspension roller, by crossing the guide members between the rows in a horizontal direction;
electrode plate insertion means including at least one of (i) an electrode plate transport member for positive electrode plates on which a predetermined number of positive electrode plates are placed, and (ii) an electrode plate transport member for negative electrode plates on which a predetermined number of negative electrode plates are placed, and being adapted to move the electrode plate transport members into respective folds of the suspended body, thereby inserting at least one of the positive electrode plates and the negative electrode plates into the respective folds; and
suspended body supply means equipped with at least two support rollers for supporting the suspended body at midpoints upstream, in a transport direction of the suspended body, of the suspension roller on a relatively upstream side and a relatively downstream side; and at least one buffer roller disposed between the support rollers, making contact with one surface of the suspended body, and arranged to be ascendable and descendable in a vertical direction,
wherein when the buffer roller is located at a predetermined ascending position or descending position while contacting the suspended body, the suspended body is suspended between the guide members via the suspension roller, and during zigzag folding associated with movement of the guide members, the buffer roller descends or ascends.

10. A secondary battery manufacturing apparatus, comprising:
zigzag folding means having a plurality of guide members arranged zigzagging in a vertical direction, and being adapted to zigzag-fold a superposed body, which comprises one of a positive electrode plate and a negative electrode plate sandwiched between two separators, and which is suspended between one row and another row of the guide members via a suspension roller, by crossing the guide members between the rows in a horizontal direction;
electrode plate insertion means including electrode plate transport members on which a predetermined number of the electrode plates other than the sandwiched one electrode plate are placed, and being adapted to move the electrode plate transport members into respective folds of the superposed body, thereby inserting the other electrode plates into the respective folds; and
separator supply means equipped with at least two support rollers for supporting the superposed body at midpoints upstream, in a transport direction of the superposed body, of the suspension roller on a relatively upstream side and a relatively downstream side; and at least one buffer roller disposed between the support rollers, brought into contact with one surface of the superposed body, and arranged to be ascendable and descendable in a vertical direction,
wherein when the buffer roller is located at a predetermined ascending position or descending position while contacting the superposed body, the superposed body is suspended between the guide members via the suspension roller, and during zigzag folding associated with movement of the guide members, the buffer roller descends or ascends.

11. The secondary battery manufacturing apparatus according to claim 9, wherein
air blowing means for blowing a gas from below a lower surface of the suspended body to support the suspended body is disposed between the most downstream support roller of the support rollers and the suspension roller.

12. The secondary battery manufacturing apparatus according to claim 10, wherein
air blowing means for blowing a gas from below a lower surface of the superposed body to support the superposed body is disposed between the most downstream support roller of the support rollers and the suspension roller.

13. The secondary battery manufacturing apparatus according to claim 11, wherein
the gas is ionized air.

14. The secondary battery manufacturing apparatus according to claim 12, wherein
the gas is ionized air.

15. The secondary battery manufacturing apparatus according to claim 9, wherein
between the most downstream support roller of the support rollers and the suspension roller, the suspended body is transported in an inclined manner so as to ascend from the support roller toward the suspension roller.

16. The secondary battery manufacturing apparatus according to claim 10, wherein
between the most downstream support roller of the support rollers and the suspension roller, the superposed body is transported in an inclined manner so as to ascend from the support roller toward the suspension roller.

17. The secondary battery manufacturing method according to claim 1, wherein the suspended body consists of a separator, and wherein positive electrode plates and negative electrode plates are inserted alternately into respective folds of the zigzag-folded separator, thereby forming a layered body having the positive electrode plates and the negative electrode plates alternately superposed on each other via the separator.

18. The secondary battery manufacturing apparatus according to claim 9, wherein said electrode plate insertion means including both (i) said electrode plate transport member for positive electrode plates on which a predetermined number of positive electrode plates are placed, and (ii) said electrode plate transport member for negative electrode plates on which a predetermined number of negative electrode plates are placed, and is adapted to move the electrode plate transport members for positive electrode plates and negative electrode plates into respective folds of the suspended body, thereby inserting the positive electrode plates and the negative electrode plates alternately into the respective folds.

* * * * *